United States Patent [19]

Deibele

[11] 4,251,961
[45] Feb. 24, 1981

[54] DETACHABLE INSULATING COVER ASSEMBLY FOR GREENHOUSES AND THE LIKE

[76] Inventor: Manfred Deibele, Hauptstrasse 60, 7332 Eislingen/Fils, Fed. Rep. of Germany

[21] Appl. No.: 72,334

[22] Filed: Sep. 5, 1979

Related U.S. Application Data

[63] Continuation-in-part of Ser. No. 835,540, Sep. 22, 1977, Pat. No. 4,174,596.

[30] Foreign Application Priority Data

Sep. 5, 1978 [DE] Fed. Rep. of Germany ....... 2838623
Sep. 5, 1978 [DE] Fed. Rep. of Germany ....... 2838624

[51] Int. Cl.³ .............................................. E06B 9/00
[52] U.S. Cl. ......................................... 52/63; 52/202; 52/404; 52/361
[58] Field of Search .................. 52/63, 202, 404, 361, 52/364, 765, 509, 512, 825, 826; 24/221 R, 109, 156 P, 157 R, 153.1, 162; 85/5 P; 160/84

[56] References Cited

U.S. PATENT DOCUMENTS

| | | | |
|---|---|---|---|
| 2,232,533 | 2/1941 | Illsche | 24/221 R |
| 2,412,744 | 12/1946 | Nelson | 52/361 X |
| 2,648,882 | 8/1953 | Van Buren | 24/109 |
| 3,238,835 | 3/1966 | Rosenberg | 52/404 X |
| 3,375,831 | 4/1968 | Serbus | 52/63 X |
| 3,378,975 | 4/1968 | Hill | 52/404 X |
| 3,881,288 | 5/1975 | Fay | 52/404 X |
| 3,930,344 | 1/1976 | Gahler | 52/63 X |
| 4,037,751 | 7/1977 | Miller et al. | 52/404 X |
| 4,174,596 | 11/1979 | Deibele | 52/202 |

*Primary Examiner*—J. Karl Bell
*Attorney, Agent, or Firm*—Joseph A. Geiger

[57] ABSTRACT

A detachable insulating cover assembly for greenhouses and similar structures using plastic cover sheets for the creation of a stationary air layer, the sheets being held in place by manually clampable and releasable fastener assemblies, each consisting of a fastener base with a stem and a fastener cap, the fastener bases being detachably clampable to the base flange of T-bars which form the skeleton of the greenhouse, using transversely movable attachment members with retaining noses that reach behind the edges of the T-bar base flange in the clamped position. Several variants of attachment members are disclosed.

20 Claims, 33 Drawing Figures

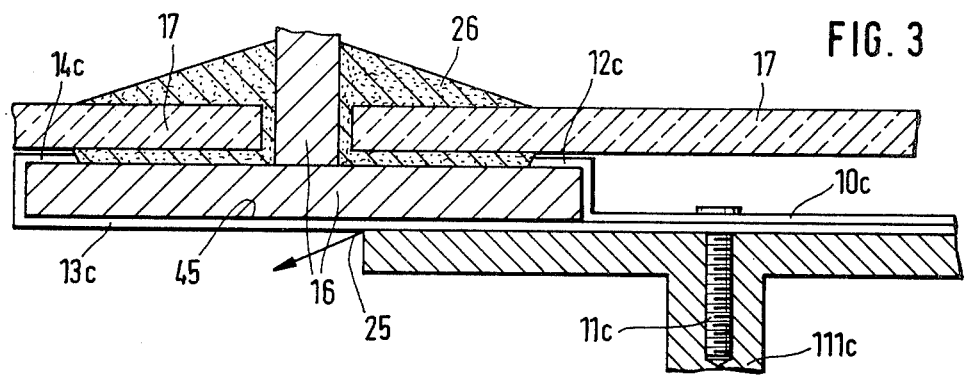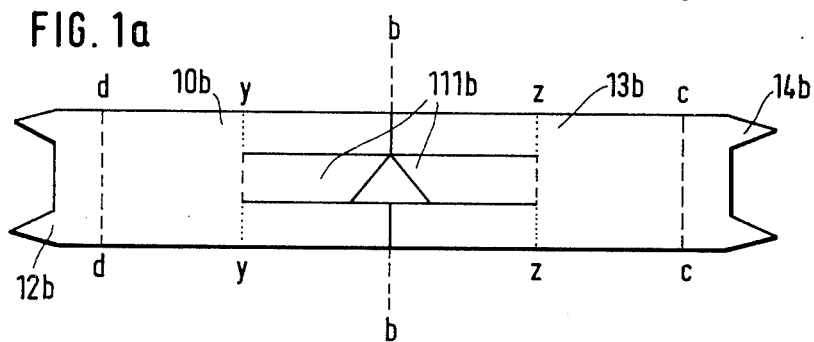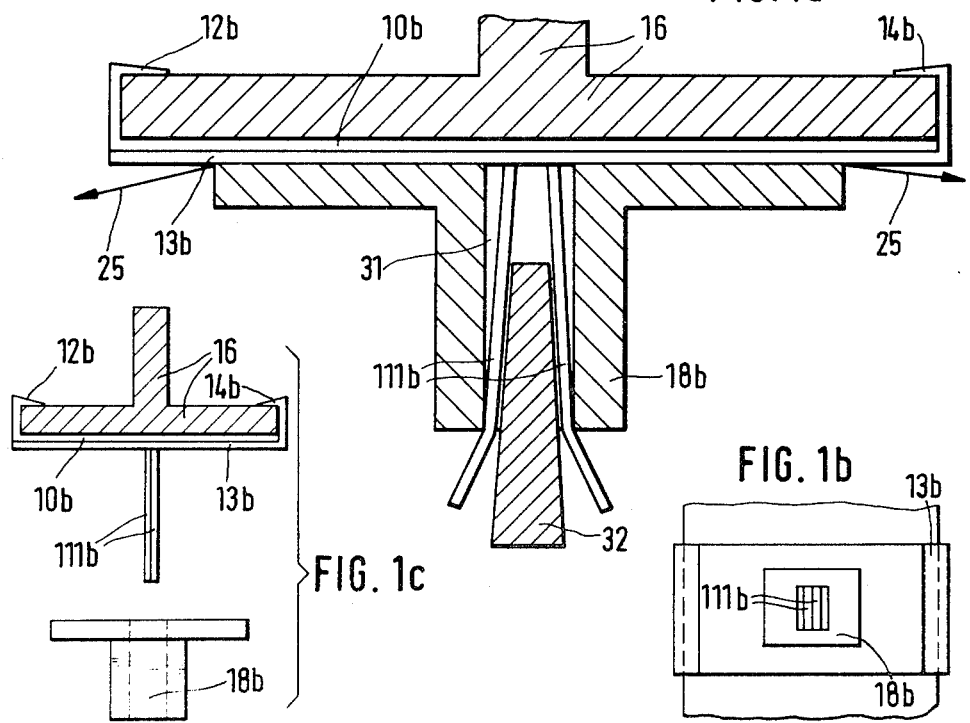

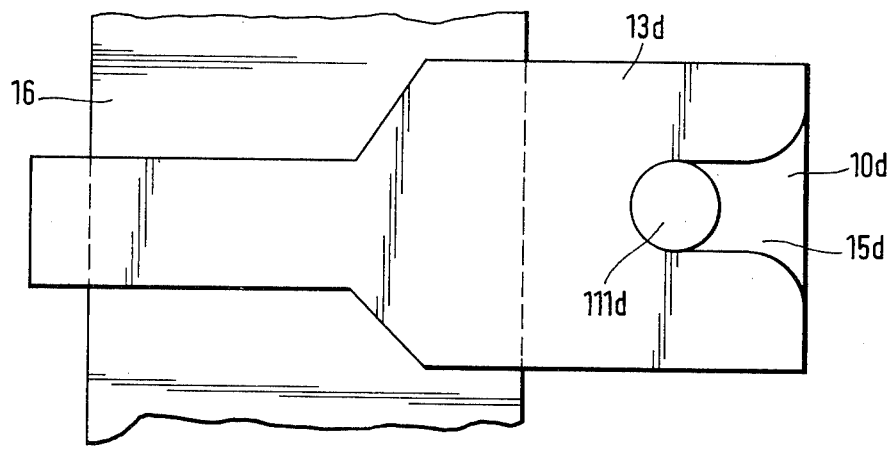
FIG. 4
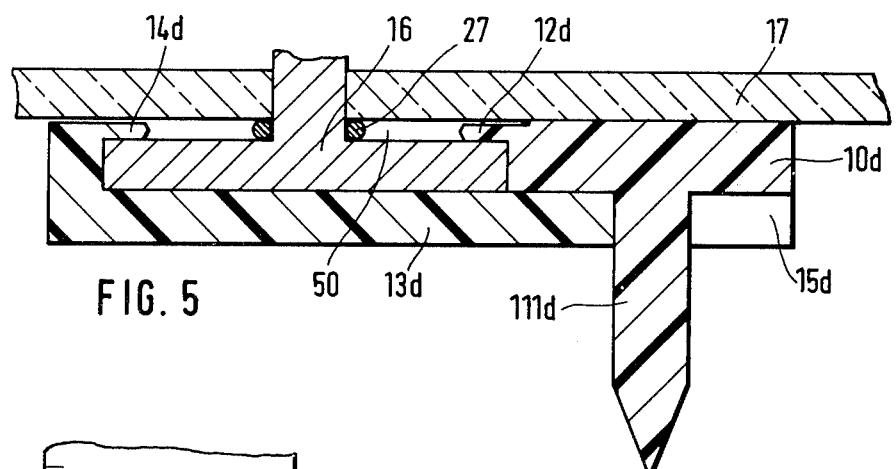
FIG. 5
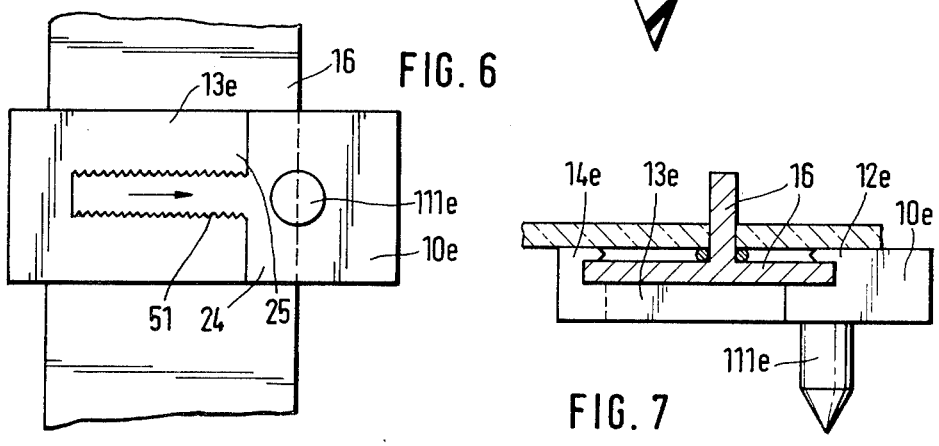
FIG. 6
FIG. 7

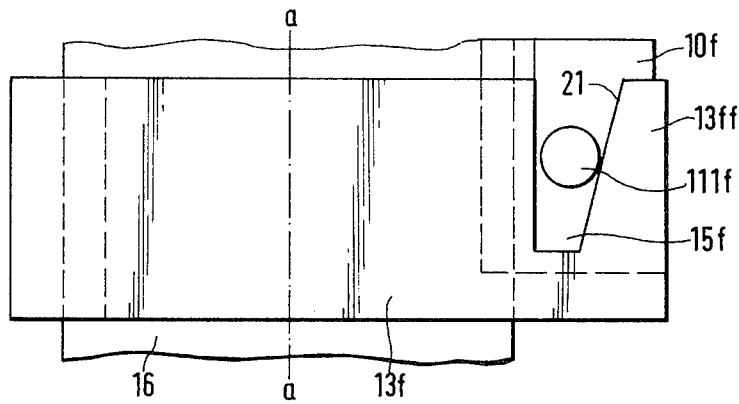
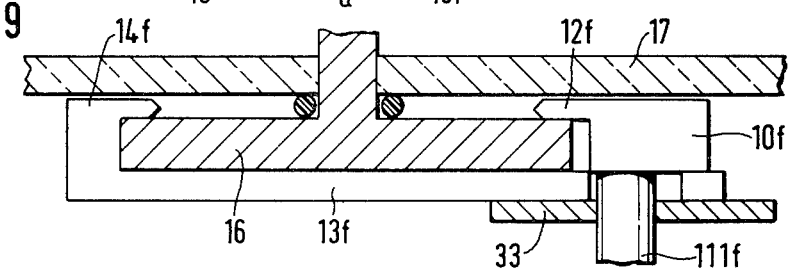
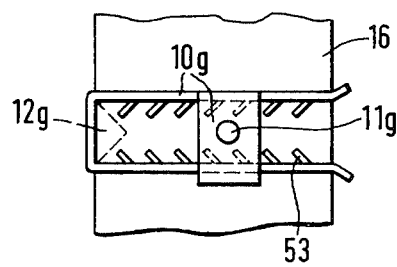
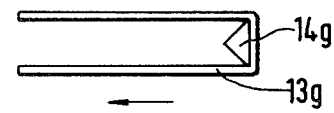
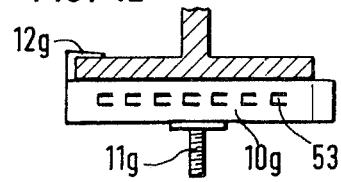
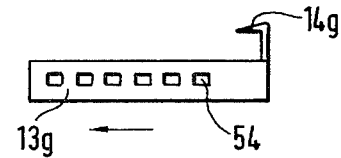
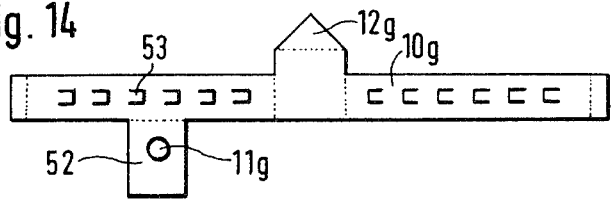

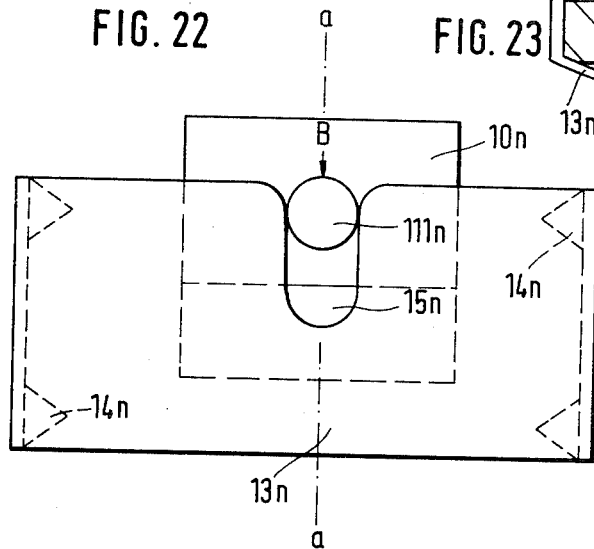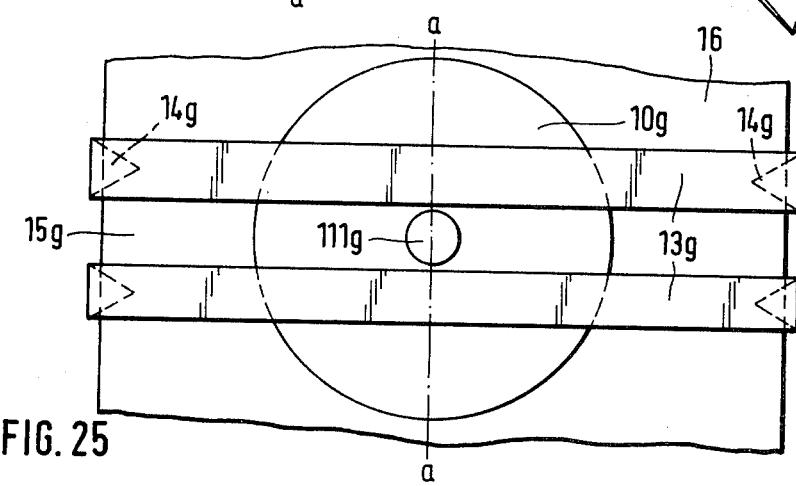

DETACHABLE INSULATING COVER ASSEMBLY FOR GREENHOUSES AND THE LIKE

RELATED U.S. APPLICATION DATA

This application is a continuation-in-part of Ser. No. 835,540, filed Sept. 22, 1977, now U.S. Pat. No. 4,174,596.

BACKGROUND OF THE INVENTION

1. Field of the Invention

The present invention relates to flexible insulating cover structures, and, more particularly, to a detachable insulating cover assembly which is adapted for use in connection with greenhouses and similar structures, having large surfaces which are to be covered with removable low cost insulating sheets, in order to reduce convective heat loss to the outside of the structure.

2. Description of the Prior Art

It is known that convective heat loss through the walls of a structure, especially a light structure such as a greenhouse, can be greatly reduced through the attachment of inexpensive insulating cover sheets of transparent plastic material to the inside of the walls. Comparative measurements have revealed energy savings of up to 40 percent. Particularly advantageous for this purpose are so-called bubble sheets which consist of two layers of thin plastic film which enclose between them rows of small air cushions.

In one known application, large surfaces of bubble sheet are simply being bolted to the structural members of a greenhouse, using screws and hold-down washers (as described in the periodical "Zierpflanzenbau", Issue No. 9, Apr. 28, 1976, pp. 315–318).

In my copending U.S. patent application, Ser. No. 835,540, of Sept. 22, 1977, now U.S. Pat. No. 4,174,596 I have disclosed a detachable insulating cover assembly for greenhouses and the like which features a cover sheet of flexible air-impermeable plastic material which is attached to a wall element of the greenhouse by means of a plurality of spaced fastener assemblies which are arranged along a clamping line near the edge of the sheet, a typical fastener assembly consisting of a fastener base which is permanently attached to the wall element, which is a structural member or a glass panel, for example, and a fastener cap which, when attached to the fastener base, clamps the cover sheet to the latter. For this purpose, each fastener base has a pointed stem over which the cover sheet is impaled, prior to attachment of the fastener cap. The edges of each cover sheet are sealed against the greenhouse structure, so that a closed air space is obtained which contains stationary air which serve as an effective barrier to convective heat transfer.

The cover sheets are removable from the greenhouse structure by releasing the fastener caps and by pulling the cover sheet from the stems of the fastener assemblies. However, the fastener bases remain in place, glued to the inside of the window panels.

It has now been found that there are situations, where it is desirable to attach the fastener assemblies to the structural skeleton of the greenhouse in such a way that the fastener bases are likewise removable from the structure. Such an arrangement has to take into consideration the fact that greenhouses of different age, with different structural components, have to be so equipped. For example, in older greenhouses, the glass panels are in most cases held in place by means of sealing putty, their back side being located very closely to the supporting faces of the skeleton members. The latter are in most cases T-bars, the upstanding central web of the T-bar being located between the edges of two adjacent glass panels. Adding to the problem of limited space between the flange portions of the T-bar and the back sides of the glass panels is the problem of the presence of hardened putty in that space, so that, in the past, there existed a general reluctance towards attempts to find a solution to this problem, especially in view of the fact that the temporary attachment of fastener assemblies to a structural member had to be accomplished without drilling holes into the structural member.

One prior art attempt at attaching insulating cover sheets to structural members of a greenhouse involves the use of U-shaped leaf-spring clamps which open to the width of the structural member, and then clamp the lateral side faces of the latter, when released. This type of clamp is basically identical with the binder clip, an item of office hardward which is primarily used as a temporary clamp for a stack of loose-leaves, or the like. One disadvantage of this type of clamp is that it is generally not suitable for regular T-bars, but that it requires special structural profiles with much larger lateral surfaces, in order to provide a reliable sheet clamping action against these surfaces. (The use of such spring clamps has been suggested by Sibco Universal S.A., 92081 Paris, La Defense.)

Another attempt at a solution to this problem is disclosed in German Gebrauchsmuster (Utility Model) No. 78 02 785, which suggests a fastener base in the form of a one-piece, twice refolded leaf spring with claw-like extremities which reach around the longitudinal edges of the T-bar, thereby attaching the clamp to the structural member. To the top portion of the leaf spring is attached a stem for the attachment of a fastener cap. This proposed clamp has the disadvantage of requiring a special tool for its installation and removal. It also presents a problem with respect to the stability of attachment.

SUMMARY OF THE INVENTION

Underlying the present invention is the primary objective of providing an improved solution to the earlier-mentioned problem of attaching fastener assemblies to the back side of a T-bar of a greenhouse structure, with the requirement that the fastener assembly be easy to attach and remove and mass-produceable at low cost.

The present invention proposes to attain this objective by suggesting an insulating cover assembly which is similar to that which is disclosed in my above-mentioned earlier patent, but which has fastener assemblies whose fastener bases are removably clampable to the T-bar and fastener caps which are insertable over the stems of the fastener bases, in order to clamp the cover sheet between them.

In a preferred embodiment of the invention, the fastener base is attached to the T-bar of the greenhouse skeleton by means of two attachment members which are movable relative to one another, so as to place bent-over retaining noses on the outer edge of each attachment member behind the longitudinal edges of the flange portions of the T-bar. In this engaged position, the two attachment members are locked against each other by the frictional action of a wedge-type interaction and/or by the clamping action of the fastener base, when the latter is screwed onto an upstanding stem stud which is carried by one of the attachment members.

Several modifications of this preferred embodiment are proposed, using either symmetrically arranged, substantially identical attachment members which place the fastener assembly in the middle of the T-bar profile, or unequal laterally offset attachment members which place the fastener assembly above or near a longitudinal edge of the T-bar. The two attachment members may be sheet metal stampings, overlapping each other, or they may be injection-molded plastic parts which cooperate in the clamped position with a snap-type elastic engagement. It is further possible to arrange the two attachment members so that they produce a wedging action against each other in the clamped position, or that they maintain their clamped position by means of barbs.

Still another embodiment of the invention suggests a toggle-action lock between the two attachment members, for greater ease in manual placement and removal of the fastener assembly. Furthermore, it is also possible to arrange the attachment members in such a way that one of the two members is a leaf spring which bridges the back of the T-bar from side to side, carrying attachment noses on both ends which, in the flat condition of the leaf spring, are spread apart and, in a convexly curved condition produced by the second attachment member, exert a clamping action against the edges of the T-bar.

Lastly, it is also possible to provide the attachment of the fastener base by means of a single attachment member which can be clamped against the edges of the T-bar with an angular motion which brings two diametrically opposed retaining noses of the member into clamping engagement behind the edges of the T-bar, a pair of flexible positioning fingers retaining the attachment member in its clamped position. For removal, the positioning fingers are lifted, so that the attachment member can be rotated out of its clamping position.

In a majority of the aforementioned embodiments of the invention, the fastener base is connected to the attachment members, after the latter are clamped in place, whereby the fastener base also serves to secure the attachment members in their clamped position.

BRIEF DESCRIPTION OF THE DRAWINGS

Further special features and advantages of the invention will become apparent from the description following below, when taken together with the accompanying drawings which illustrate, by way of example, several embodiments of the invention which are represented in the various figures as follows:

FIGS. 1a–1d show a variant of the embodiment of FIG. 1, where the stem stud for the fastener assembly is formed by upended tongues of the attachment members, FIG. 1a showing the die-cutting pattern for the attachment members, FIG. 1b showing the installed assembly, as seen from the front;

FIGS. 2 and 3 show another variant of the embodiment of FIG. 1, in a frontal view (FIG. 2) and a cross section (FIG. 3), where the stem of the fastener assembly is located laterally beyond the supporting T-bar;

FIGS. 4 and 5 show an embodiment similar to that of FIGS. 2 and 3, using injection-molded parts;

FIGS. 6 and 7 show a modification of the embodiment of FIGS. 4 and 5, where the attachment members occupy the same plane;

FIGS. 8 and 9 show an embodiment in which the attachment members engage each other in a self-locking wedging action;

FIGS. 10–14 show still another embodiment, using stamped U-shaped attachment members, FIG. 14 showing one member as a developed stamping;

FIGS. 22–24 show attachment members of which one is a leaf spring and the other one a cooperating wedge;

FIGS. 25 and 26 show a modification of the embodiment of FIG. 22; and

DESCRIPTION OF THE PREFERRED EMBODIMENTS

For a complete description of the present invention, to the extent that it is not given hereinbelow, reference is made to my copending U.S. patent application Ser. No. 835,540 of Sept. 22, 1977, which is now U.S. Pat. No. 4,174,596. The descriptive portion of this patent should be considered incorporated herein by reference.

Figure 1:
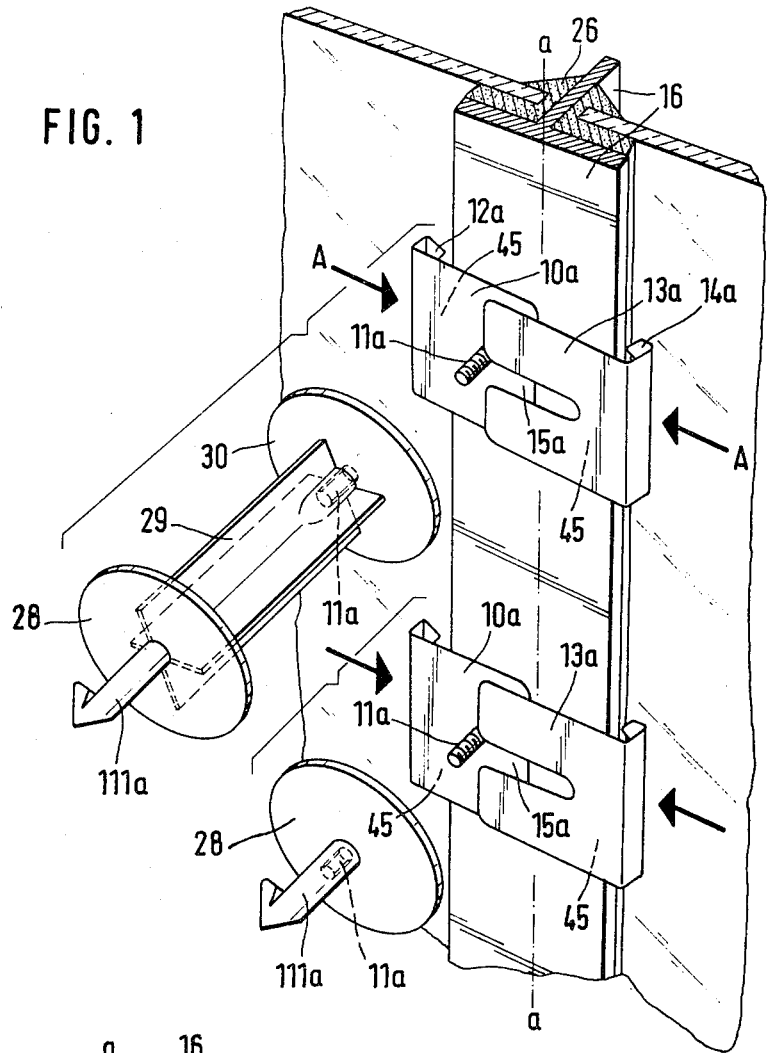
FIG. 1 shows, in a partially exploded perspective view, a portion of a greenhouse wall with a T-bar carrying two different fastener assemblies, as part of a first embodiment of the invention.

The various clamping devices which are illustrated in FIGS. 1 through 29 concern themselves with the removable attachment of a fastener assembly to a structural member of a building, more particularly of a greenhouse. Commonly, the skeleton members of such a greenhouse are T-bars, as shown in FIG. 1, which hold the edges of adjoining glass panels by means of putty or special rubber profiles and retaining clips riding on the web portion of the T-bars.

For each fastener assembly, i.e. at each point where the cover sheet is attached to the T-bar 16, there is provided a set of attachment members, in most cases two members which cooperate to create a clamping engagement with the flat base flange to the T-bar 16. The various figures of the drawings show different versions of attachment members, all having the same purpose.

Similar or analogous parts in the various embodiments are therefore designated with the same reference numerals, each embodiment having a different letter suffix. Accordingly, the embodiment of FIGS. 1 and 2 uses the letter a, the embodiment of FIGS. 1a through 1d uses the letter b, and the embodiment of FIGS. 2 and 3 uses the letter c, etc.

A typical set of attachment members consists of a base carrying member 10 to which the fastener base 18 is attached, or attachable, and a clamping member 13 which cooperates with the base carrying member 10. The two attachment members 10 and 13 have retaining noses 12 and 14 at their extremities. The retaining noses 12 and 14 extend rearwardly and inwardly, so as to grip the edge portions of the base flange of the T-bar 16 from behind in a releasable clamping action. The noses 12 and 14 are pointed, so that they can penetrate any putty or other sealant that may be in the gap between the base flange of the T-bar 16 and the glass panel 17. In each case, the attachment members are moved relative to each other in a direction which is substantially parallel to the forwardly facing mounting surface 45 of the T-bar 16.

In FIG. 1 of the drawing, the attachment members consist of two stampings which are similar in shape, each having a rectangular outline with a bent-over edge portion carrying two retaining noses 12a and 14a, respectively. While the clamping member 13a has a central slot 15a, the base carrying member 10a has attached to it a stem stud 11a which engages the slot 15a, when the two attachment members 10a and 13a are mounted on the T-bar 16. The mounting of the attachment members involves placement of the members in an overlapping relationship against the mounting surface 45 of the T-bar, followed by a lateral closing movement in the direction of arrow A, until both members abut against the lateral edges of the T-bar base flange. In this position, a fastener base 18a is screwed onto the stem stud 11a, with the result that the base flange 30 of the fastener base exerts a clamping action against the clamping member 13a, thereby holding the attachment members in their clamped position. The stem 111a of the fastener assembly may be of the elevated type, having a separated clamping flange 28 which is spaced from the base flange 30 by means of longitudinal connecting ribs 29, or the clamping flange 28 may also serve as the base flange, in which case the stem 111a itself is the part which carries the thread engaging the stem stud 11a.

In the embodiment of FIGS. 1a through 1d, the two attachment members are likewise stampings, made from flat stock, as shown in FIG. 1a. In this case, however, the two members are functionally identical, in terms of serving as base carrying member 10b or clamping members 13b. The two members have matching upstanding tongue portions which, when joined together in the clamped position of the device, form a central stem stud 11b over which the fastener base 18b can be forcibly inserted. Once inserted over the stem stud 11b, the fastener base 18b is held in place, thanks to an outwardly kinked outline of the tongue portions which constitute the stem stud 11b. The bore in the fastener base 18b may be cylindrical or tapered.

Figure 2:
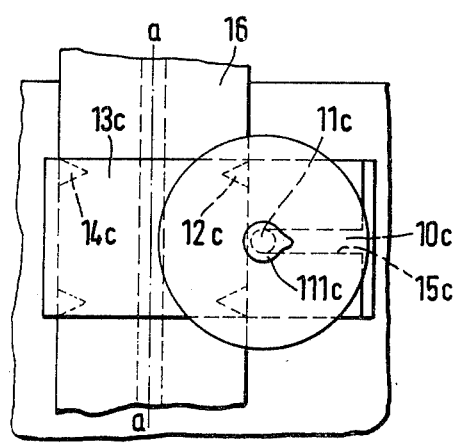

The embodiment which is shown in FIGS. 2 and 3 is very similar to that of FIG. 1, except for the fact that the stem stud 11c is located laterally outside the area of the base flange of the T-bar 16. For this purpose, the clamping member 13c is elongated to reach a distance beyond the width of the mounting surface 45 of the T-bar, and the cooperating base carrying member 10c is located in its entirety on one side of the T-bar 16. Its stem stud 11c reaches through an open slot 15c of the clamping member 13c. This configuration also allows for a modified version in which the stem stud is replaced by a regular screw which may or may not be rotationally attached to the base carrying member 10c.

In the embodiment of FIGS. 4 and 5, the two attachment members are injection-molded parts, the stem 111d being an integral part of the base carrying member 10d and serving at the same time as a clamping and retaining element in cooperation with the clamping member 13d. For this purpose, the latter reaches again sideways beyond the width of the mounting surface 45 of the T-bar 16, having in its protruding extremity an open slot 15d which cooperates with the diameter of the stem 111d in such a way that an interference-type clamping fit is obtained. A retaining lip 14d of the clamping member 13d and a similar retaining lip 12d of the base carrying member 10d reach behind the lateral edges of the T-bar 16, into the gap 50 which is formed by the sealing element 27 taking the place of the putty. The base carrying member 10d, instead of carrying the stem 111d, may also carry a stem stud 11d over which a hollow fastener base with a separate stem is then inserted. The clamping engagement between the slot 15d of the clamping member 13d and the stem 111d can be further improved by providing a slightly tapered bottom portion of the stem 111d which, when the clamping member 13d is lifted, is disengaged from its slot 15d, thereby facilitating the transverse approaching movement of the attachment members.

The embodiment of FIGS. 6 and 7 resembles that of FIGS. 4 and 5, inasmuch as injection-molded parts are used, but it differs therefrom by suggesting an engagement between the base carrying member 10e and the clamping member 13e which is provided outside the stem 111e. This clamping engagement is in the form of a transverse slot 15e in the clamping member 13e and a matching extension on the stem carrying member 10e. Serrated surfaces on the slot and extension provide a frictional engagement between the attachment members.

In FIGS. 8 and 9, the clamping member 13f is provided with a tapered slot 15f which is open in the longitudinal direction of the T-bar 16, cooperating with the stem 111f of the base carrying member 10f in such a way that a longitudinal displacement of the latter produces a transverse approaching movement between the attachment members, as the stem 111f slides along the cam surface 21 of the slot 15f. The inclination of the cam surface 21 with respect to the longitudinal axis a—a of the T-bar is such that a self-locking wedging action is obtained between the attachment members 10f and 13f. A washer 33 placed over the stem 111f serves as a support for the cover sheet (not shown). Again, the stem 111f may also be a stem stud 11f to which a separate fastener base with a hollow stem is attached.

The embodiment of FIGS. 10 through 14 shows attachment members which are in the form of metal stampings. However, unlike the previously described stamped attachment members which overlap each other, the base carrying member 10g and the clamping member 13g of this embodiment are arranged to be mounted on edge, so as to form a frame-like assembly in the clamped position. FIG. 14 shows the base carrying member 10g in a developed outline which illustrates how the retaining nose 12g and a stud-carrying lug are produced as integral portions of the stamping. Rows of openings 54 in the leg portions of the clamping member 13g and cooperating barb-like tongues 53 on the insides of the base carrying member 10g provide a secure engagement between the attachment members in the clamped position.

Figure 15:
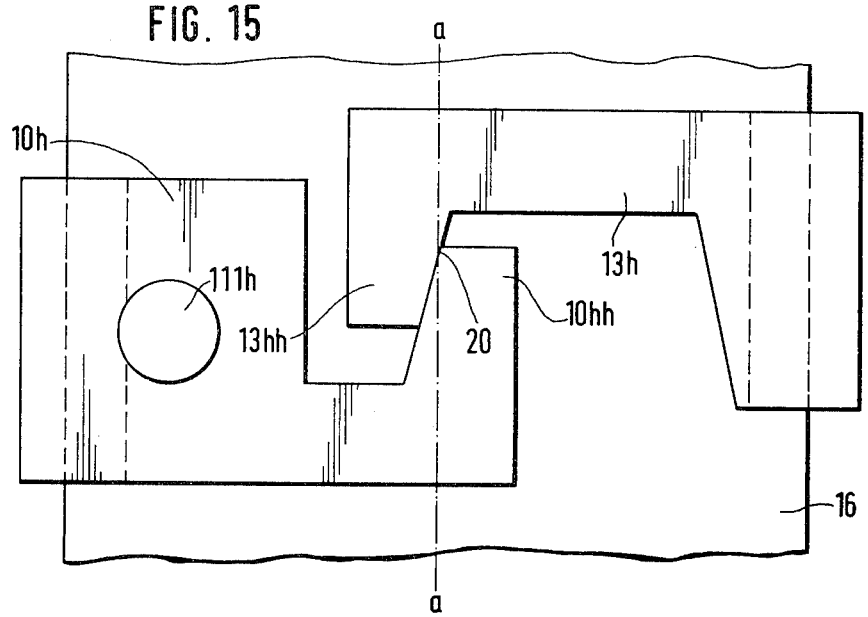
FIGS. 15 and 16 show an example of attachment members which engage each other with a self-locking wedging action.
Figure 16:
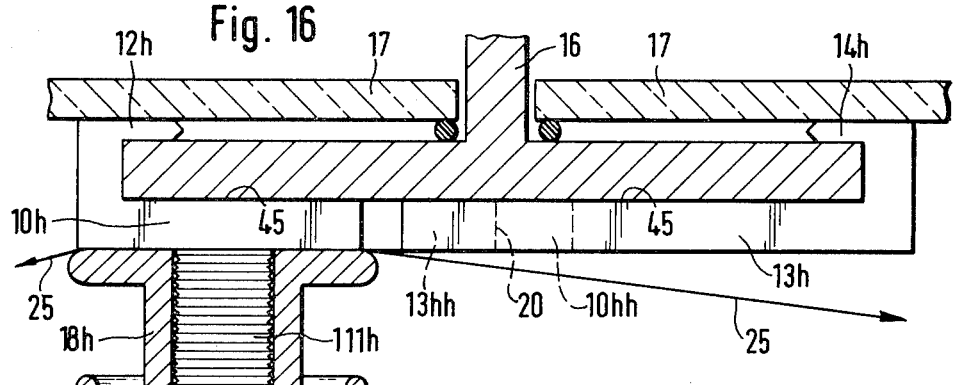

The embodiments of FIGS. 15 and 16 resembles that of FIGS. 8 and 9, inasmuch as the clamping approach between the base carrying member 10h and the clamping member 13h is in the longitudinal sense of the T-bar 16, whereby cooperating inclined cam surfaces 19 and 20 of the two attachment members produce a transverse approaching motion of the retaining noses 12h and 14h of the members behind the T-bar edges. The stem 111h is an integral part of the base carrying member 10h, a fastener cap being shown attached thereto and clamping the cover sheet 25 between it and the base carrying member 10h (FIG. 16).

Figure 17:
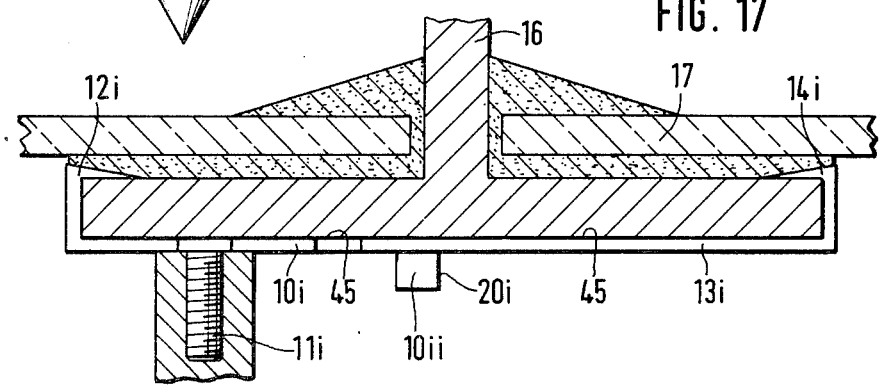
FIG. 17 shows a modification of the parts of FIGS. 15 and 16, using stamped attachment members.

FIG. 17 shows a modification of the embodiment of FIGS. 15 and 16, the two attachment members 10i and 13i being in the form of sheet metal stampings, rather than injection-molded plastic parts. The cam surfaces 19i and 20i are formed by upended edge portions of the two attachment members 10i and 13i.

Figure 18:
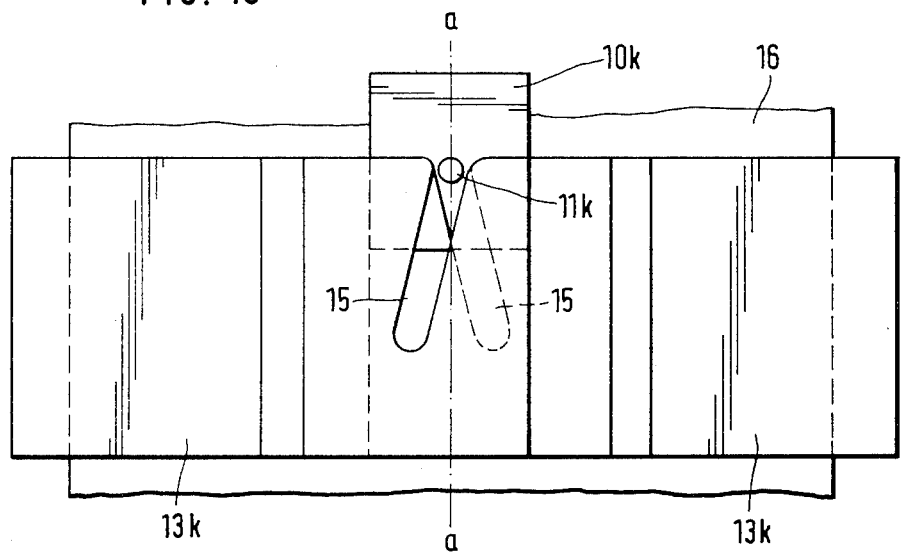
FIGS. 18 and 19 show an embodiment using three attachment members in a self-locking wedging action.
Figure 19:
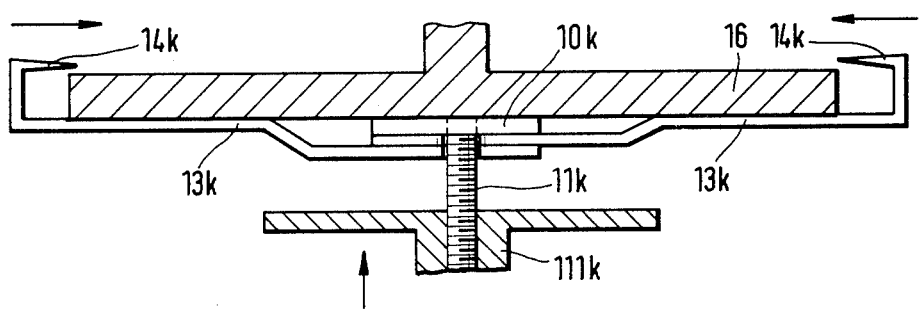

In the embodiment of FIGS. 18 and 19, a central base carrying member 10k cooperates with two clamping members 13k, serving as a cam lock between the latter. For this purpose, the two clamping members 13k have oppositely inclined slots 15k which present cam surfaces to the stem stud 11k of the base carrying member 10k. The latter, when advanced in the longitudinal sense of the T-bar 16, thus pulls the two clamping members 13k transversely against each other, so that their retaining noses 14k move behind the edges of the T-bar 16. In the clamped position, a fastener base 18k with a stem 111k is attached to the stem stud 11k, thereby securing the attachment members in their clamped position.

Figure 20:
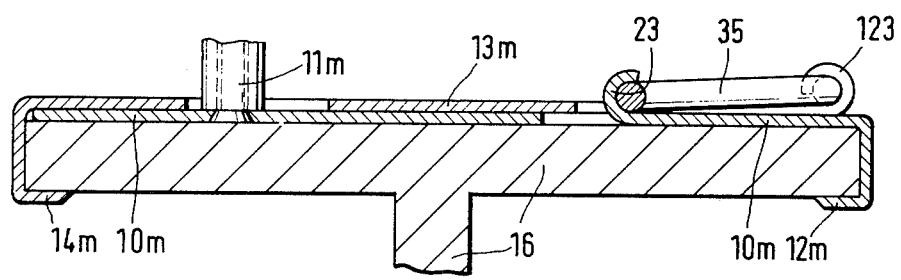
FIGS. 20 and 21 show a pair of attachment members with a toggle-action clamping arrangement.
Figure 21:
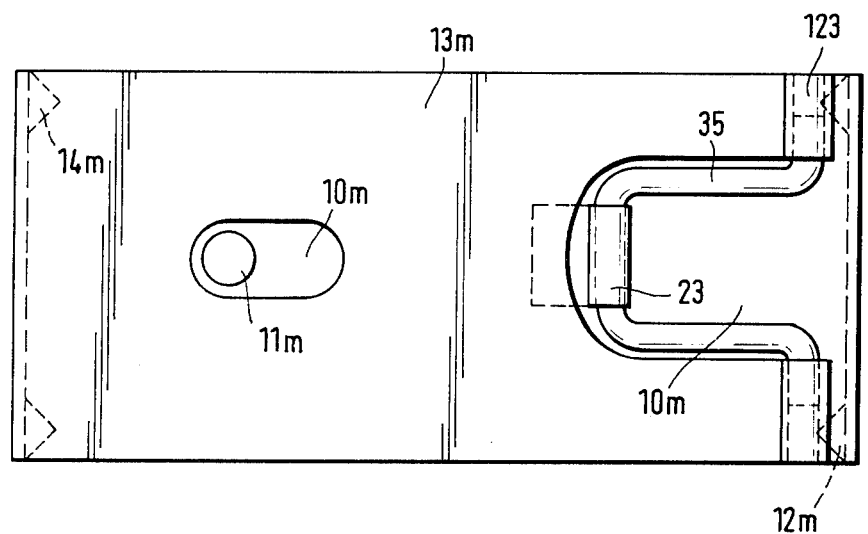

In FIGS. 20 and 21 is shown an embodiment of the invention which features two attachment members which are interconnected by means of a toggle linkage. The latter consists of a toggle arm 35 which engages a pivot loop 23 on the extremity of the base carrying member 10m and two pivot loops 123 of the base clamping member 13m. A pivoting motion of the toggle arm 35 about its pivot center at 23 creates a lateral movement of the clamping member 13m relative to the base carrying member 10m and the T-bar 16, so that, in the open position of the lock, the retaining noses 14m and 12m of the attachment members are freely engageable over the edges of the T-bar 16. By then lowering the toggle arm 35 against the base carrying member 10m, a lateral clamping action between the attachment members is achieved. In this position, the toggle linkage is self-locking. This clamped position is further secured by the fastener base which is inserted over the stem stud 11m, following flattening of the toggle linkage.

FIGS. 22 through 24 show an embodiment in which the clamping member 13n reaches over the entire width of the T-bar 16, carrying retaining noses 14n on both extremities. In its free state, the clamping member 13n is long enough to permit engagement of its retaining noses 14n over the edges of the T-bar 16. Clamping engagement with the latter is achieved by bending the clamping member 13n away from the mounting surface 45 of the T-bar, using for this purpose the base carrying member 10n. The latter, in addition to having the appropriate curvature to fit under the raised clamping member 13n, has a wedge-shaped entry portion with which it lifts the clamping member 13n, when it is advanced in the direction of the axis a—a of the T-bar. To the extent that the stem 111n of the base carrying member 10n would interfere with the advancement of the latter into the clamping position, the clamping member 13n has a slot 15n. The clamping member 13n may be made of spring steel.

In the embodiment of FIGS. 25 and 26, the clamping member 13q resembles the clamping member of FIG. 22, except that its slot 15q is not an open slot and that the clamping movement of the base carrying member 10q is rotational instead of linear. For this purpose, the base carrying member 10q has provided in its body two grooves 100 which, when placed in alignment with the clamping member 13q, allow the latter to assume a near-flat condition in which its retaining noses 14q are freely engageable over the edges of the T-bar 16. By rotating the base carrying member 10q approximately 90 degrees, the clamping member 13q is raised and bent into a convexly curved shape, while its retaining noses 14q engage the edges of the T-bar 16. The base carrying member 10q carries a stem 111q, or a stem stud, if a separate fastener base is provided.

Figure 27:
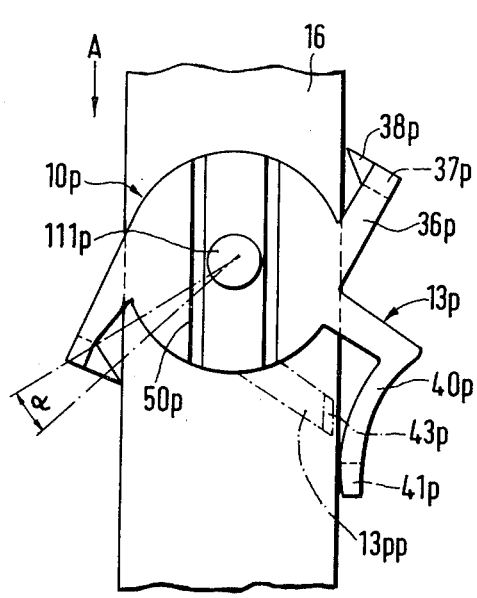
FIGS. 27–29 show a single attachment member for the fastener assembly of the invention which is attachable in an angular movement.
Figure 28:
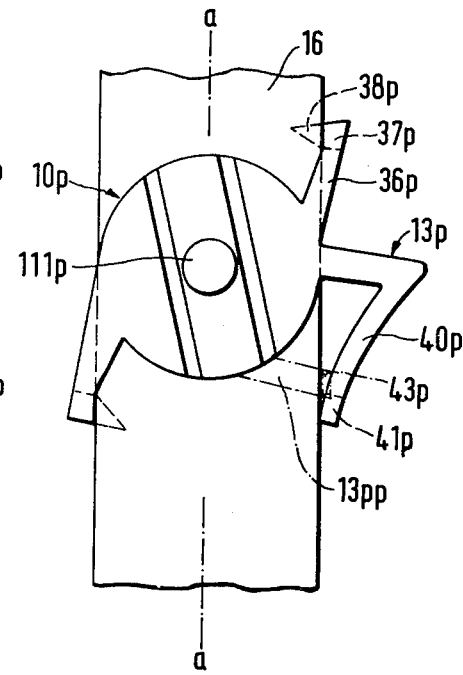
Figure 29:
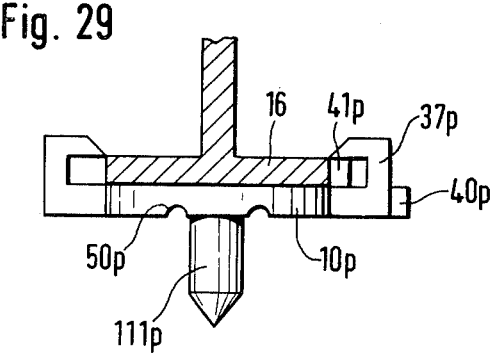

In FIGS. 27 through 29 is illustrated an embodiment of the invention in which a rotatable base carrying member 10p carries the retaining noses 12p for both sides of the T-bar 16 and in which the separate clamping member has been omitted, its place being taken by two positioning fingers 13p which lock the attachment member in its clamping position, against an accidental release from the T-bar 16. Two transverse slots 44p give the positioning fingers 13p the necessary flexibility, so that they can be lifted, in order to disengage their locking noses 43p from the edges of the T-bar 16. The attachment member 10p may be a sheet metal stamping or an injection-molded part. As a sheet metal stamping, it offers higher rigidity and a superior locking action of the positioning fingers 13p. The two retaining noses 12p of the member 10p are in the form of bent-over extremities of two diametrically opposite triangular extensions of the stamping. In order to attach the member 10p to the T-bar 16, the member is simply placed against the mounting wall 45 in an orientation in which the retaining noses 12p barely clear the lateral edges of the T-bar 16. Because the locking noses 43p tend to lift the member 10p from the mounting surface 45, it is necessary to apply a slight pressure against the member 10p, while manually rotating it in a clockwise direction, until the retaining noses 12p are engaged behind the T-bar edges and the locking noses 43p of the positioning fingers snap over the T-bar edges.

It should be understood, of course, that the foregoing disclosure describes only preferred embodiments of the invention and that it is intended to cover all changes and modifications of these examples of the invention which fall within the scope of the appended claims.

I claim the following:

1. An insulating cover assembly which is readily attachable to and detachable from the wall members of the sides and roof of a building structure, especially a greenhouse whose supporting skeleton includes T-bars serving as skeleton members, the insulating cover assembly comprising:

a cover sheet of flexible air-impermeable plastic material;

means for mounting the cover sheet in a spaced coextensive relationship with a wall member, so as to define an air space between the cover sheet and the wall member; and means for sealing off the borderline of said air space, so as to enclose within it a layer of stationary air which serves as a barrier to convective heat transfer; and wherein the cover sheet mounting means includes a series of fastener assemblies which are spaced along a clamping line, near an edge of the cover sheet, at points where the latter is coextensive with the base surface of a T-bar of the greenhouse skeleton, each fastener assembly comprising a fastener base with a pointed stem, which fastener base is removably clampable to the T-bar base, and a fastener cap which is insertable over and securable to said stem, following impalement of the cover sheet over the stem, so as to clamp the cover sheet between the fastener base and the fastener cap.

2. An insulating cover assembly as defined in claim 1, wherein
the air space sealing means is defined by an edge portion of the cover sheet which is located outside the clamping line, which edge portion forms a fold toward the wall member of the greenhouse with which the cover sheet is coextensive, thereby stiffening the cover sheet along the fold and establishing an elastic sealing contact with the wall member due to the resiliency of the cover sheet in said fold.

3. An insulating cover assembly as defined in claim 1, wherein
the fastener bases of the fastener assemblies include attachment members which have a surface in contact with the mounting surface of the T-bar and retaining noses in the form of hook-shaped lateral extremities which are adapted to reach behind the two longitudinal edges of the T-bar base flange; and
the attachment members are movable on to the mounting surface, in order to engage and disengage their retaining noses behind said T-bar edges.

4. An insulating cover assembly as defined in claim 3, wherein
each fastener base includes two attachment members with separate retaining noses engaging the two longitudinal edges of the T-bar base flange;
the two attachment members are movable relative to one another, in order to engage and disengage their retaining noses behind the T-bar edges; and
the two attachment members are lockable against one another in the position in which their retaining noses are engaged behind the T-bar edges.

5. An insulating cover assembly as defined in claim 4, wherein
the two attachment members are two sheet metal stampings of substantially identical rectangular outline, the members reaching inwardly from the T-bar edges in such a way that one member overlies the other in at least the midportion of the mounting surface;
the underlying attachment member carries an upstanding stem stud, and the overlying attachment member has a slot in the location of the stem stud, to accommodate the relative movement between the attachment members; and
the fastener base has a central bore with which it is forcibly engageable over the stem stud, in a clamping relationship therewith, so that the two attachment members and the fastener base are rigidly locked together.

6. An insulating cover assembly as defined in claim 5, wherein
the stem stud is a threaded stud; and
the fastener base further includes a clamping flange which faces towards the attachment members and a threaded bore inside its stem which cooperates with the threaded stem.

7. An insulating cover assembly as defined in claim 4, wherein
the two attachment members are sheet metal stampings, the first member reaching from its T-bar edge over the width of the T-bar base flange and a distance beyond the other T-bar edge, the second member being arranged underneath the overhanging portion of the first member, extending outwardly from its T-bar edge; and
the fastener base further includes a clamping flange which faces towards the attachment members and a releasable fastener which clamps the clamping flange against the two attachment members in the overhanging portion of the first attachment member.

8. An insulating cover assembly as defined in claim 4, wherein
the two attachment members are sheet metal stampings of substantially identical rectangular outline, the members reaching inwardly from the T-bar edges to at least the midportion of the mounting surface;
each attachment member further includes an upstanding tongue-shaped extension in the midportion of the mounting surface, the upstanding extensions of the two attachment members being so arranged that, in the engaged position of the attachment members, they form two halves of a stem stud; and
the fastener base has a central bore with which it is forcibly engageable over the stem stud in a resilient clamping relationship therewith, so that the two attachment members and the fastener base are locked together.

9. An insulating cover assembly as defined in claim 4, wherein
the two attachment members are movable towards one another in a direction which is transverse to the T-bar edges; and
the two attachment members have resiliently yielding elements which create a frictional locking engagement between the attachment members in the position in which their retaining noses are engaged behind the T-bar edges.

10. An insulating cover assembly as defined in claim 9, wherein
the first attachment member reaches from its T-bar edge over the width of the T-bar flange and a distance beyond the other T-bar edge, having an engagement slot in its overhanging portion; and
the second attachment member has a flange-like portion arranged underneath the overhanging portion of the first member and an upstanding stem portion reaching through the engagement slot of the first member, thereby creating with the latter said frictional engagement.

11. An insulating cover assembly as defined in claim 9, wherein
the two attachment members reach inwardly from the two T-bar edges so as to form overlapping length portions on the mounting surface of the T-bar base flange;
said overlapping length portions define an elongated recess of one attachment member and a matching extension of the other attachment member, both being oriented in the direction of approach movement of the two members; and
the recess and extension cooperate to create said frictional locking engagement.

12. An insulating cover assembly as defined in claim 4, wherein
the two attachment members reach inwardly from the two T-bar edges in such a way that one member overlies the other;

the two attachment members are movable towards one another in a direction which is transverse to the T-bar edges; and the transverse approaching movement is obtained by means of a toggle-action knee lever linkage which connects the two attachment members, the linkage being in a self-locking position when the retaining noses of the attachment members are engaged behind the T-bar edges.

13. An insulating cover assembly as defined in claim 12, wherein the toggle-action knee lever linkage includes a toggle arm in the form of a double crank with a central bearing portion which engages an extremity of the overlying attachment member and two aligned lateral bearing portions which engage the underlying attachment member at a point where the two attachment members overlie one another.

14. An insulating cover assembly as defined in claim 4, wherein the two attachment members are movable towards one another in a direction which is parallel to the T-bar edges; and the two attachment members, while being moved in said direction, engage one another with inclined cam surfaces which cause the attachment members to be pulled closer to one another in the transverse direction, thereby engaging their retaining noses behind the T-bar edges.

15. An insulating cover assembly as defined in claim 4, wherein the two attachment members reach inwardly from the two T-bar edges in such a way that one member overlies the other, at a distance above the mounting surface of the T-bar flange;

the two attachment members have slots in their overlying portions which are slightly inclined towards their associated T-bar edges; and the fastener base further includes a stem stud with an enlarged head portion which fits between the mounting surface and the underlying attachment member and a shaft portion which engages the slots of both attachment members, whereby a movement of the stem stud along the slots of the attachment members produces an approaching movement of the latter.

16. An insulating cover assembly as defined in claim 1, wherein each fastener base includes an attachment member in the form of a flexible plate with opposite extremities which reach over both T-bar edges and retaining noses on its extremities which cooperate with the two T-bar edges, the attachment member, when flattened, having its retaining noses spaced apart for free movement over the T-bar edges and, when bent into a convex shape, having its retaining noses engaged behind the T-bar edges; and each fastener base further includes means for bending the flexible plate into said convex shape.

17. An insulating cover assembly as defined in claim 16, wherein the means for bending the plate is a wedge-like member which is insertable between the mounting surface of the T-bar base and the flexible plate and which carries a stem stud for the attachment of the fastener base thereto.

18. An insulating cover assembly as defined in claim 16, wherein the means for bending the plate is a rotatable member which is arranged between the mounting surface of the T-bar base and the flexible plate and which, in one angular position, allows for the flexible plate to be flattened and, in another angular position, bends the flexible plate into its convex shape.

19. An insulating cover assembly as defined in claim 1, wherein each fastener base includes an attachment member in the form of a rotatable attachment plate with opposite extremities which reach over both T-bar edges and two diametrically oppositely located retaining noses on its extremities which are arranged to cooperate with the two T-bar edges in such a way that the retaining noses are engageable behind the T-bar edges through rotation of the attachment plate; and each attachment plate further includes means for retaining the attachment plate in the angular position in which its retaining noses are engaged.

20. An insulating cover assembly as defined in claim 19, wherein the attachment plate retaining means includes a flexible positioning finger which, in the retaining position, reaches over a T-bar edge with a nose-like extremity.

* * * * *